United States Patent [19]
Specht et al.
[11] Patent Number: 4,500,829
[45] Date of Patent: Feb. 19, 1985

[54] ADVANCE AND RETARD PHASE-SHIFT TRANSFORMER

[75] Inventors: Theodore R. Specht, Sharon, Pa.; Edward J. Cham, Howland, Ohio
[73] Assignee: Westinghouse Electric Corp., Pittsburgh, Pa.

[21] Appl. No.: 538,391
[22] Filed: Oct. 3, 1983
[51] Int. Cl.[3] ........................ H02J 3/00; G05F 3/00
[52] U.S. Cl. ........................ 323/215; 323/216; 336/143; 336/183
[58] Field of Search ........................ 323/213, 215–219; 363/64, 152–156; 336/143, 146, 150, 183

[56] References Cited

U.S. PATENT DOCUMENTS

| | | | |
|---|---|---|---|
| 1,745,159 | 1/1930 | Frank | 323/215 |
| 2,290,233 | 7/1942 | Gilliver et al. | 323/216 |
| 2,292,829 | 8/1942 | Garin | 323/215 X |
| 2,330,088 | 9/1943 | Palley | 323/215 X |
| 2,369,038 | 2/1945 | Garin | 323/340 |
| 2,410,721 | 11/1946 | Dome | 323/218 |
| 2,421,299 | 5/1947 | Johnson | 323/215 |
| 2,794,948 | 6/1957 | Thompson et al. | 323/217 |
| 2,905,882 | 9/1959 | Koppelmann | 363/64 |

*Primary Examiner*—Peter S. Wong
*Attorney, Agent, or Firm*—D. R. Lackey

[57] ABSTRACT

A phase-shift transformer circuit providing advance or retard phase shift at any predetermined phase shift angle. The phase shift angle is determined by the ratio of the main and short windings of the transformer primary. Two links are used to provide advance or retard phase shift. One transformer winding is connected directly to a phase conductor of the three-phase power system. The remaining two transformer windings are connected to the remaining two phase conductors via the links. The links are movable such that in the advance configuration, the phase two conductor is connected to one of the transformer windings and the phase three conductor is connected to the other. In the retard phase-shift configuration, the links are moved so that the connections are reversed.

9 Claims, 6 Drawing Figures

ADVANCE AND RETARD PHASE-SHIFT TRANSFORMER

BACKGROUND OF THE INVENTION

1. Field of the Invention

This invention relates generally to phase-shift transformers, and more specifically to phase-shift transformers providing phase shift at a predetermined angle and means to easily configure the transformer to provide phase shift advance or retard.

2. Description of the Prior Art

To obtain multi-phase operation for a rectifier installation, it is common practice to use a phase-shift transformer in the high side of each rectifier transformer. The phase-shift transformer can be configured as a mesh, zig-zag, or extended delta transformer. In each configuration, the phase shift angle is determined by the turns ratio of the main windings to the short windings of the phase-shift transformer. Generally, the phase-shift transformer includes a high voltge terminal board with links to permit connecting each rectifier transformer for advance or retard phase shift by proper connection of the terminal board links. For example, in a commonly-used mesh arrangement, the phase shift can be set for advance or retard by the position of three links on the terminal board. As is well known, in the advance mode, each of the three high-voltage input leads is connected to a terminal at one end of the three main windings. in the retard mode, the links connect each input lead to a terminal at the other end of the three main windings.

For zig-zag and extended-delta transformers a complex arrangement of links is necessary to allow advance or retard phase shift because the short windings must be connected to one end of the main windings in the advance mode and to the other end in the retard mode. For example, the zig-zag configuration requires 14 studs and 6 links. The extended-delta configuration requires 13 studs and 6 links to provide advance and retard phase shift.

SUMMARY OF THE INVENTION

A phase-shift transformer for providing advance or retard phase shift, including means to easily change the phase shift from advance to retard or vice versa is disclosed. The phase-shift transformer can be configured as a mesh, zig-zag, or extended-delta transformer. A terminal board, comprising only two links, is included for connecting the transformer terminals to the high-voltage input leads. When the links are in a first position, the transformer provides advance phase shift, and in a second position, the transformer provides retard phase shift.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF THE PREFERRED EMBODIMENT

Figure 1:
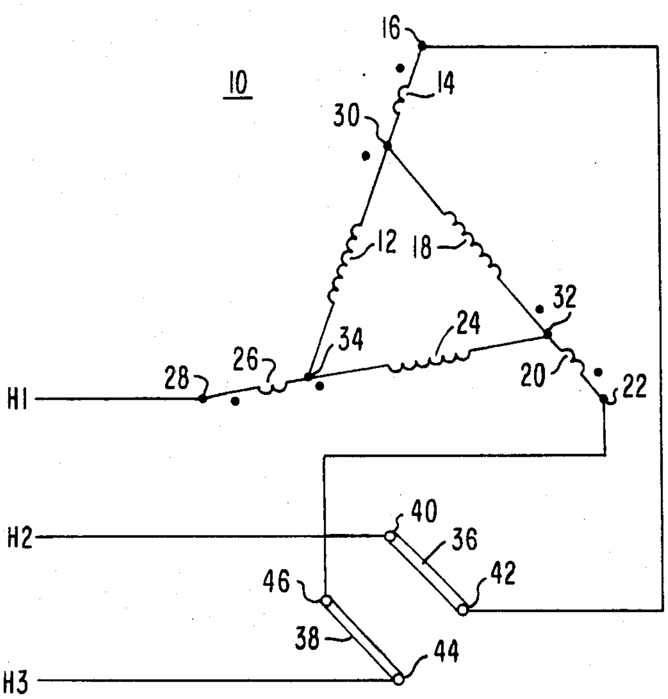
FIG. 1 illustrates a vector-winding diagram of an extended-delta phase-shift transformer constructed according to the teachings of the present invention and operating in the advance phase-shift mode.

Turning to FIG. 1, there is shown a vector-winding diagram of an extended-delta phase-shift transformer 10 constructed according to the teachings of the present invention. In the extended-delta phase-shift transformer 10, a main winding 12 is connected between terminals 30 and 34; an extended winding 14 is connected between terminals 16 and 30. The main winding 12 and the extended winding 14 constitute one leg of the extended-delta phase-shift transformer 10. A second leg of the extended-delta phase-shift transformer 10 is comprised of a main winding 18 connected between the terminal 30 and a terminal 32, and an extended winding 20 connected between the terminal 32 and a terminal 22. A third leg of the extended-delta phase-shift transformer 10 comprises a main winding 24 connected between the terminals 32 and 34 and an extended winding 26 connected between the terminal 34 and a terminal 28.

The terminal 28 is connected directly to the phase one high-voltage conductor designated H1 in FIG. 1. The terminal 16 is connected to a stud 42, and the terminal 22 is connected to a stud 46. A stud 40 is connected to the phase two high-voltage conductor (H2), and a stud 44 is connected to the phase three high-voltage input (H3). In the advance mode, which is illustrated in FIG. 1, a link 36 connects the stud 40 to the stud 42 such that the terminal 16 is connected to the phase two high-voltage conductor. Similarly, the stud 44 is connected to the stud 46 by a link 38 thereby connecting the terminal 22 to the phase three high-voltage conductor. In this configuration, the extended-delta phase-shift transformer 10 provides an advance phase shift. The phase shift angle is determined by the ratio of the extended windings 14, 20, and 26, to the main windings 12, 18, and 24, respectively. Of course, since the three phase voltages are separated by 120 electrical degrees, the terminal 28 can be connected to any of the three phase conductors with the studs 40 and 44 each connected to one of the other two phase conductors.

The secondary windings to which the extended-delta phase-shift transformer 10 is magnetically linked can be of any configuration. Although the extended-delta phase-shift transformer 10 causes negative sequence voltages in the secondary windings in the advance mode, this is of no consequence because the secondary voltage is used with a rectifier load. No reconnection of the secondary windings is required for a diode or thyristor rectifier applications. For thyristor applications, however, the phase relationships in the rectifier must be arranged in the proper sequence. This requires a simple interchange of leads in the trigger circuitry of the rectifier.

Comparing the FIG. 1 scheme to provide advance and retard phase shift with the prior art, as discussed above, it should be noted that the disclosed scheme requires only two links whereas the prior art requires at least three links (i.e., the mesh arrangement requires three links). Likewise, only four studs are required for the extended-delta phase-shift transformer 10, whereas a mesh arrangement with three links requires six studs. Since all studs and links must be insulated for high voltages, generally 110 or 150 BIL, fewer studs and links results in a cost saving. Compared to prior art extended-delta or zig-zag phase-shift transformers providing advance and retard connections, the extended-delta phase-shift transformer 10 provides even greater cost savings because the prior art configurations require significantly more studs and links than are required for the mesh arrangement.

Further, note that in the extended-delta phase-shift transformer 10, one of the terminals is connected directly to the high-voltage conductor. In the prior art mesh arrangement, none of the transformer terminals are connected directly to the high-voltage; all three terminals are connected to a stud and ultimately to a high-voltage conductor via a link. Therefore, the extended-delta phase-shift transformer 10 of the present invention reduces the number of leads from the windings to the studs. This feature lowers the reactance and lead losses providing a better transformer power factor and a more efficient rectifier installation. Also, fewer leads in a transformer assembly make the transformer less vulnerable to short circuit stresses.

Figure 2:
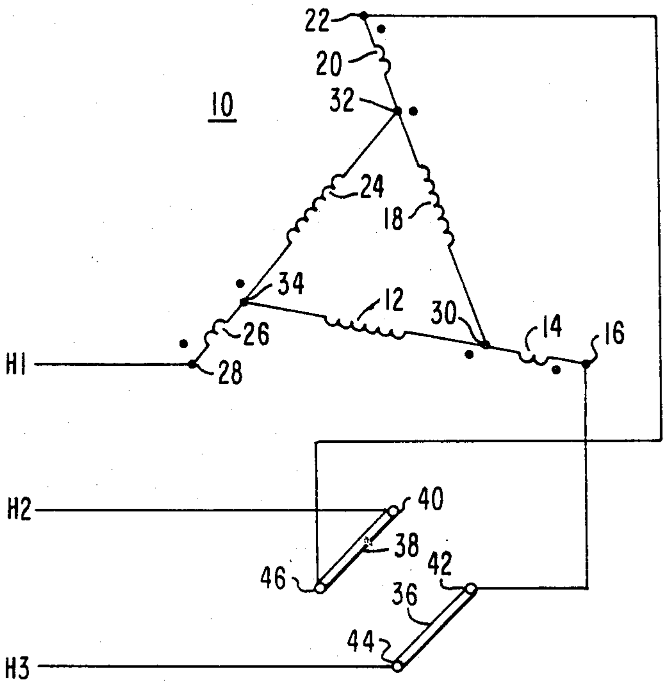
FIG. 2 illustrates a vector-winding diagram of an extended-delta phase-shift transformer constructed according to the teachings of the present invention and operating in the retard phase-shift mode.

Turning to FIG. 2, there is shown a vector-winding diagram of the extended-delta phase-shift transformer 10 connected in the retard mode. The components of FIG. 2 are identical in structure and function to the components bearing identical reference characters in FIG. 1. As can be seen, in FIG. 2 the legs of the extended-delta phase-shift transformer 10 have a different vector configuration. Whereas in FIG. 1, the terminal 16 is located at the top of the extended-delta phase-shift transformer 10 and the terminal 22 is located at the bottom right terminal thereof, the position of the terminals 16 and 22 have been interchanged in FIG. 2. In the retard mode, the terminal 22 is connected to the phase two high-voltage conductor (H2) via the stud 46, the link 38, and the stud 40. Note that in the advance mode of FIG. 1, the terminal 22 is connected to the phase three high-voltage conductor. In FIG. 2, the terminal 16 is connected to the phase three high-voltage conductor via the stud 42, the link 36, and the stud 44. To change the configuration of the extended-delta phase-shift transformer from advance to retard, the links 36 and 38 are moved from the position shown in FIG. 1 to the position of FIG. 2. This feature of the extended-delta phase-shift transformer 10 is the essence of the present invention. The simple repositioning of two links changes the phase shift from advance to retard or vice versa.

Figure 3:
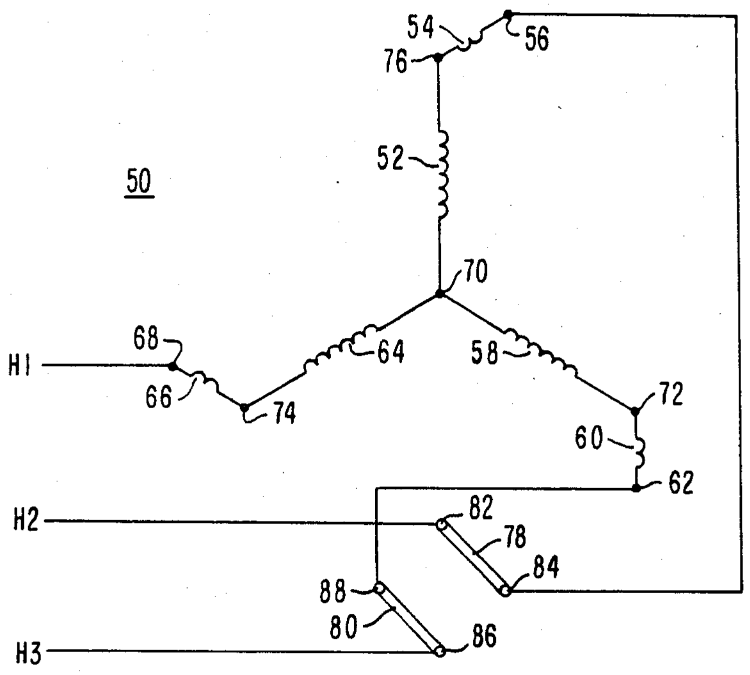
FIG. 3 illustrates a vector-winding diagram of a zig-zag phase-shift transformer constructed according to the teachings of the present invention and operating in the advance phase-shift mode.

FIG. 3 illustrates a zig-zag phase-shift transformer 50 constructed according to the teachings of the present invention. A zig winding 52 of the zig-zag phase-shift transformer 50 is connected between terminal 70 and 76; a zag winding 54 is connected between the terminal 76 and a terminal 56. A zig winding 58 is connected between the terminal 70 and a terminal 72; a zag winding 60 is connected between the terminal 72 and a terminal 62. A zig winding 64 is connected between the terminal 70 and a terminal 74; a zag winding 66 is connected between the terminal 74 and a terminal 68.

The terminal 68 is connected to the phase one high-voltage conductor, designated H1 in FIG. 3. The terminal 56 is connected to a stud 84; the stud 84 is connected to a stud 82 via a link 78. The stud 82 is connected to the phase two high-voltage conductor, designated H2. The terminal 62 of the zig-zag phase-shift transformer 50 is connected to a stud 88; the stud 88 is connected to a stud 86 via a link 80. The stud 86 is connected to the phase three high-voltage conductor designated H3. The zig-zag phase-shift transformer 50 as illustrated in FIG. 3 is connected to provide advance phase shift. The amount of phase shift is determined by the ratio of the number of turns of the zag windings 54, 60, and 66, and the zig windings 52, 58, and 64, respectively. In FIG. 3, the terminal 56 is connected to the phase two high-voltage conductor and the terminal 62 is connected to the phase three high-voltage conductor; this provides advance phase shift. As discussed above, the zig-zag phase-shift transformer 50 also provides less expensive means for incorporating advance or retard phase shift in a phase-shift transformer than the prior art.

Figure 4:
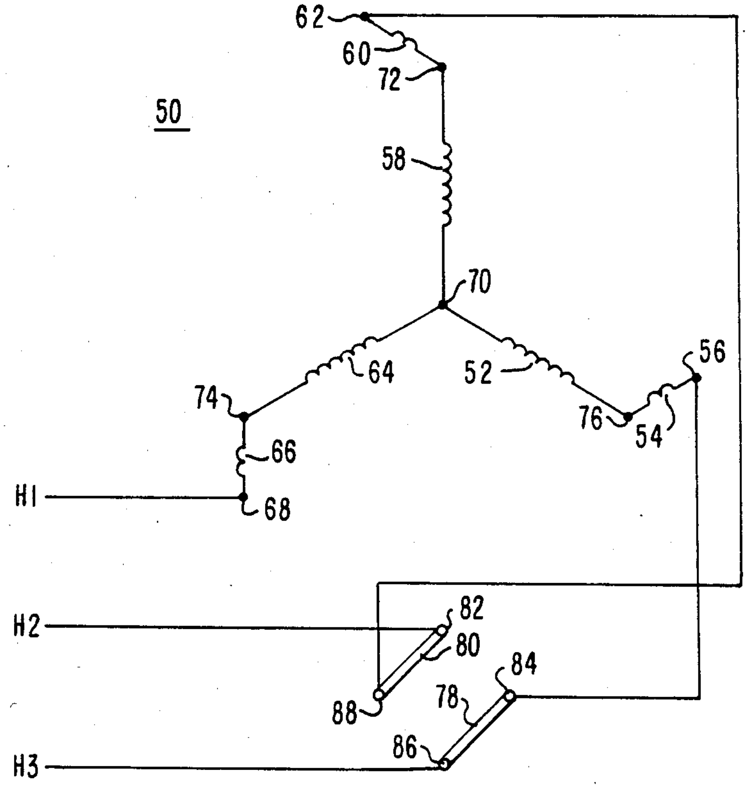
FIG. 4 illustrates a vector-winding diagram of a zig-zag phase-shift transformer constructed according to the teachings of the present invention and operating in the retard phase-shift mode.

FIG. 4 illustrates the retard mode of connection for the zig-zag phase-shift transformer 50, and the components of FIG. 4 are identical in structure and function to the components bearing identical reference characters in FIG. 3. Note that in FIG. 4, the terminal 56 is connected to the phase three high-voltage conductor via the stud 84, the link 78, and the stud 86. Recall that in FIG. 3, the terminal 56 is connected to the phase two high-voltage conductor. Also in FIG. 4, the terminal 62 is connected to the phase two high-voltage conductor via the stud 88, the link 80, and the stud 82. With the link position shown in FIG. 4, the zig-zag phase-shift transformer 50 provides retard phase shift.

Figure 5:
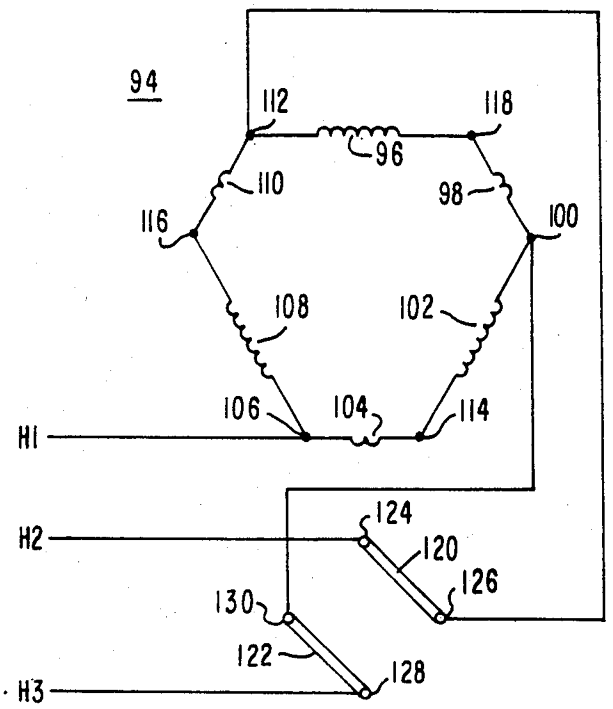
FIG. 5 illustrates a vector-winding diagram of a mesh phase-shift transformer constructed according to the teachings of the present invention and operating in the advance phase-shift mode.

Turning to FIG. 5, there is shown a vector-winding diagram of a mesh phase-shift transformer 94 constructed according to the teachings of the present invention. A main winding 95 is connected between terminals 112 and 118; a short winding 98 is connected between the terminal 118 and a terminal 100. A main winding 102 is connected between the terminal 100 and a terminal 114; a short winding 104 is connected between the terminal 114 and a terminal 106. A main winding 108 is connected between the terminal 106 and a terminal 116; a short winding 110 is connected between the terminal 116 and the terminal 112. The terminal 106 is connected directly to the phase one high-voltage conductor (H1). The terminal 100 is connected to a stud 130; the stud 130 is connected to a stud 128 via a link 122. The stud 128 is connected to the phase three high-voltage conductor (H3). The terminal 112 is connected to a stud 126; the stud 126 is connected to a stud 124 via a link 120. The stud 124 is also connected to the phase two high-voltage conductor (H2). With the links 120 and 122 in the position shown in FIG. 5, the mesh phase-shift transformer 94 provides advance phase shift. The degree of phase shift is based on the ratio of the turns of the short windings 98, 104, and 110, to the main windings 96, 102, and 108, respectively. As compared to the prior art mesh phase-shift transformers, the mesh phase-shift transformer 94 of the present invention requires fewer links and studs, resulting in a cost saving.

Figure 6:
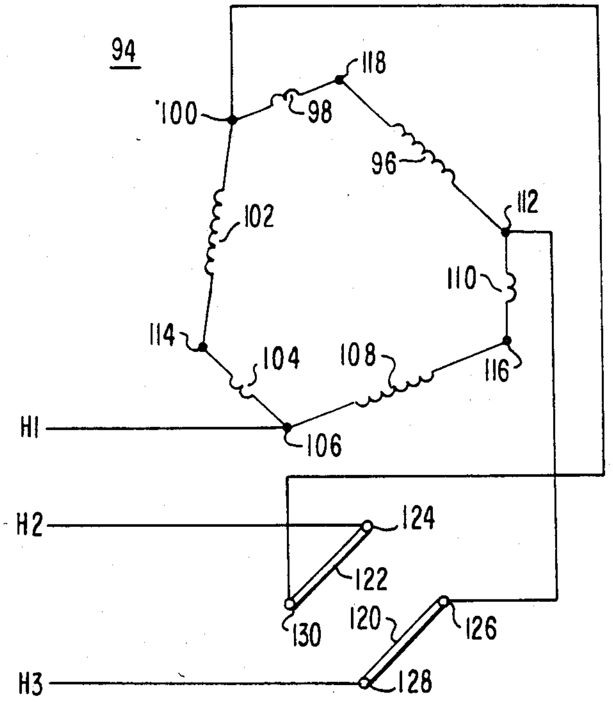
FIG. 6 illustrates a vector-winding diagram of a mesh phase-shift transformer constructed according to the teachings of the present invention and operating in the retard phase-shift mode.

Turning to FIG. 6, there is shown a vector winding diagram for the mesh phase-shift transformer 94 connected for retard phase shift. The components of FIG. 6 are identical in structure and function to the components bearing identical reference characters in FIG. 5. Note that in FIG. 6, the terminal 100 is connected to the phase two high-voltage conductor via the stud 130, the link 122, and the stud 124; in FIG. 5, the terminal 100 is connected to the phase three high-voltage conductor. Also in FIG. 6, the terminal 112 is connected to the phase three high-voltage conductor via the stud 126, the link 120, and the stud 128. In FIG. 5 the terminal 112 is connected to the phase two high-voltage conductor.

As described, the transformers illustrated in FIGS. 1 through 6 represent primary windings for use with separate secondary windings. It is obvious to those skilled in the art that the present invention also applies to autotransformers where the load is connected to appropriate points of the primary winding. For example, in the extended-delta configuration the load can be connected to the corners of the extended-delta; for the zig-zag configuration the load can be connected to the inner "zig" winding; for the mesh configuration the load can be connected to the three terminals not connected to the source.

What is claimed is:

1. A phase-shift transformer circuit adapted for connection to a three-phase power system for providing a phase-shifted ac signal at a predetermined advance or retard phase shift angle, said phase-shift transformer circuit comprising:
   - a magnetic core;
   - electrical winding means disposed in inductive relation with said magnetic core, for establishing a magnetic flux therein;
   - said electrical winding means including a primary winding, having first, second, and third input terminals connected to first, second, and third phase coils respectively, and including a secondary winding having a plurality of output terminals;
   - each of said first, said second, and said third phase coils of said primary winding including first and second portions;
   - each of said first and said second portions of said first, and second, and said third phase coils having a predetermined number of turns and wound on said magnetic core to obtain the predetermined phase shift angle;
   - said first input terminal being adapted for connection to a first selected phase of the power system;
   - switchable means having first and second configurations, wherein in said first configuration said second input terminal is adapted for connection to a second selected phase of the power system and said third input terminal is adapted for connection to a third selected phase of the power system to provide an advance phase-shifted ac signal at said plurality of output terminals, and wherein in said second configuration said second input terminal is adapted for connection to the third selected phase of the power system and said third input terminal is adapted for connection to the second selected phase of the power system to provide a retard phase-shifted ac signal at said plurality of output terminals.

2. The phase-shift transformer circuit of claim 1, wherein the first, the second, and the third phase coils of the primary winding are connected in an extended-delta configuration.

3. The phase-shift transformer circuit of claim 1, wherein the first, the second, and the third phase coils of the primary winding are connected in a zig-zag configuration.

4. The phase-shift transformer circuit of claim 1, wherein the first, the second, and the third phase coils of the primary winding are connected in a mesh configuration.

5. The phase-shift transformer circuit of claim 1, wherein the switchable means includes:
   - a first stud connected to the second input terminal;
   - a second stud connected to the second selected phase of the power system;
   - a third stud connected to the third input terminal;
   - a fourth stud connected to the third selected phase of the power system;
   - a first movable link for connecting said first stud to said second stud in the advance phase-shift configuration, and for connecting said first stud to said fourth stud in the retard phase-shift configuration; and
   - a second movable link for connecting said third stud to said fourth stud in the advance phase-shift configuration, and for connecting said third stud to said second stud in the retard phase-shift configuration.

6. A phase-shift transformer circuit adapted for connection to a three-phase power system for providing a phase-shifted ac signal at a predetermined advance or retard phase shift angle, said phase-shift transformer circuit comprising:
   - a magnetic core;
   - electrical winding means disposed in inductive relation with said magnetic core, for establishing a magnetic flux therein;
   - said electrical winding means including a primary winding having first, second, and third phase coils and including a secondary winding having a plurality of output terminals;
   - each of said first, said second, and said third phase coils having first and second portions;
   - each of said first and said second portions of said first, said second, and said third phase coils of said primary winding having a predetermined number of turns and wound on said magnetic core to obtain the predetermined phase shift angle;
   - said first phase coil being adapted for connection to a first selected phase of the power system;
   - said second and said third phase coils each including a flexible lead, wherein in said advance phase-shift configuration said flexible lead of said second coil is adapted for connection to a second selected phase of the power system and said flexible lead of said third phase coil is adapted for connection to a third selected phase of the power system to provide an advance phase-shifted ac signal at said plurality of output terminals, and wherein in said retard phase-shift mode, said flexible lead of said second phase coil is adapted for connection to the third selected phase of the power system, and said flexible lead of said third phase coil is adapted for connection to the second selected phase of the power system to provide a retard phase-shifted ac signal at said plurality of output terminals.

7. The phase-shift transformer circuit of claim 6, wherein the first, the second, and the third phase coils of the primary winding are connected in an extended-delta configuration.

8. The phase-shift transformer circuit of claim 6, wherein the first, the second, and the third phase coils of the primary winding are connected in a zig-zag configuration.

9. The phase-shift transformer circuit of claim 6, wherein the first, the second, and the third phase coils of the primary winding are connected in a mesh configuration.

* * * * *